C. W. ABBOTT.
ELECTRICAL CONDUIT.
APPLICATION FILED JUNE 22, 1914.
1,186,532.
Patented June 13, 1916.
FIG. 2
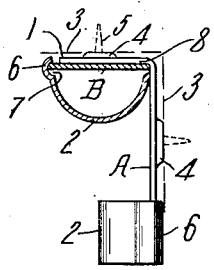
FIG. 1
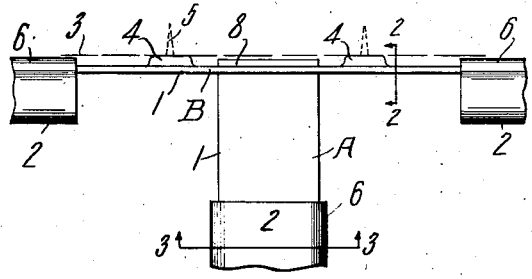
FIG. 5
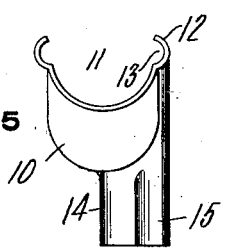
FIG. 3
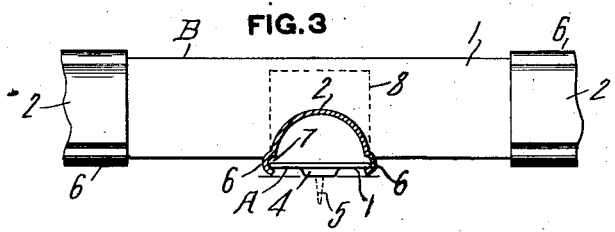
FIG. 8
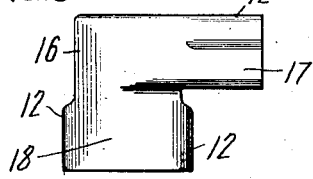
FIG. 4
FIG. 6
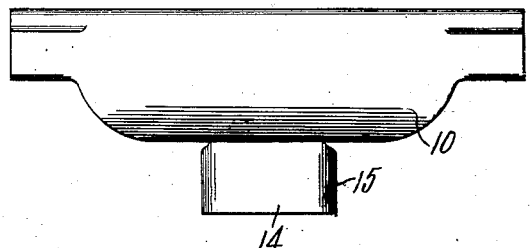
FIG. 7
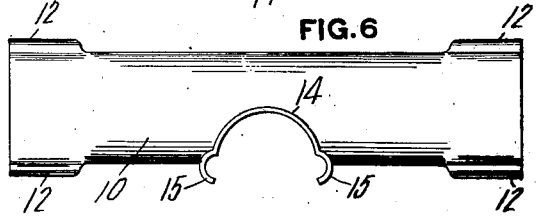
WITNESSES
W. T. Holman
Glenn H. Leresche
INVENTOR
Chauncey W. Abbott,
By Fred'k W. Winter.
Attorney.

UNITED STATES PATENT OFFICE.

CHAUNCEY W. ABBOTT, OF AUBURN, NEW YORK, ASSIGNOR TO THE AMERICAN CONDUIT MANUFACTURING COMPANY, OF PITTSBURGH, PENNSYLVANIA, A CORPORATION OF PENNSYLVANIA.

ELECTRICAL CONDUIT.

1,186,532.  Specification of Letters Patent. Patented June 13, 1916.

Application filed June 22, 1914. Serial No. 846,569.

*To all whom it may concern:*

Be it known that I, CHAUNCEY W. ABBOTT, a resident of Auburn, in the county of Cayuga and State of New York, have invented a new and useful Improvement in Electrical Conduits, of which the following is a specification.

This invention relates to that class of electrical conduits known as metal moldings and which are usually made from a base section adapted to be secured to a supporting surface, such as a wall or ceiling, and a removable cover section.

In an application of even date herewith, Serial No. 846,567, I have described and illustrated a conduit of the character specified, which is of simple construction, easy and cheap to manufacture, easy to apply, in which the members are connected so as to afford electrical continuity, and one which can be fitted to the wall or ceiling with no trimming or other shaping further than cutting the members to the desired length.

The invention of the present application has for its object to provide a simple and efficient joint for such a conduit at angles and corners, and particularly a joint connecting a conduit, say, running vertically up a wall with a conduit running along the ceiling in one or more directions from the upper end of the vertical conduit.

In the accompanying drawings Figure 1 is an elevational view of a T joint of the character specified; Figs. 2 and 3 are cross sectional views of the same on the line 2—2 and 3—3, respectively, looking in the direction of the arrows; Fig. 4 is an elevation of the cap or covering member for said joint; Fig. 5 is an end view of the same; Fig. 6 is a bottom view of the same; Fig. 7 is an elevation of the same joint applied to an angle or what is known as an elbow joint; and Fig. 8 is an elevation of the cover or cap member for the same.

The conduit proper comprises a suitable base member 1 and a cap or cover member 2. The base member is shown as a flat strip of suitable base metal with parallel edges, and provided with suitable means for spacing the same from the supporting surface 3. The spacing means may be of various forms as illustrated in my application above identified, and is here shown in the form of bosses 4 formed by depressing the metal, and in which are openings or holes for receiving the screws or nails 5 for fastening the base to the supporting surface. The edges of the base member project laterally and are substantially square. This flat strip is secured to the supporting surface by means of the screws or nails, and it can be readily carried around angles or in corners by merely bending the same, the flat strip lending itself readily to such bending.

The cover member or cap 2 is of general U, channel or bow shape in cross section, and is formed from a strip of resilient metal, preferably by drawing, with its extreme edges as at 6, bent inwardly and preferably formed with grooves 7 adjacent to said edges, and which grooves snap over the edges of the base member, and securely hold the cover in place, all as described in my application above identified It is frequently desirable to run one of these conduits up a supporting wall or partition, and then carry the same at right angles along the ceiling in either one or both directions. When carried in both directions it forms a T as shown in Figs. 1 to 6, where A indicates the vertically running conduit, and B the horizontally running conduit extending in both directions. To form this joint the upper end of the vertical base strip 1 is merely bent at right angles with the horizontal portion 8 resting directly on and in electrical contact with the base member 1 of the horizontal branches. These base strips lie flat face against flat face, and if desired may be further united by means of a small rivet, or by punching parts out of the contact strips so as to partially interlock the same, but this is not necessary. This forms a very simple mechanical connection between the vertically and horizontally extending base members. This joint is covered by the cap member shown in Figs. 4 to 6, this having a rather large dome-shaped body 10 to allow space for splicing the conductors at the joint, which body is open on its rear side as at 11, and has its edges at its end portions bent inwardly, as at 12, forming the grooves 13 which snap over the edges of the horizontal base member 1, or the edges of the adjacent horizontal cover members 2. Extending downwardly from the body at its rear side is a projection 14 which in horizontal section is substantially the same in contour as the cover member 2, having its edges bent inwardly to form the grooved portions 15 which snap over the edges of the vertical base member 1, or the edges of the adjacent vertical cover member 2. These cap members are formed by stamping or pressing from a sheet of metal and for standard base and cover members are of uniform size. The cover members for the T joint can be readily fitted in place by merely snapping the edges thereof over the edges of the adjacent parts. This joint can be made by merely turning the end of the vertical base strip at an angle of 90 degrees, cutting it off, nailing or screwing both the vertical and horizontal base strips in place, and after the wires are strung, snapping the cover members 2 over the bases and, finally, snapping the cover members 10 over the joint, thus making a neat, sightly joint, and with minimum labor.

In the case of an angle or elbow joint, the construction shown in Fig. 7 is employed, this being identical with that shown in Fig. 1, except that the horizontal base member 1 extends in only one direction. The cover or cap member therefor is shown in Fig. 8 and has an angle body 16 with the horizontal leg 17 open on the top and the vertical leg 18 open on the back and having the edges at the ends of said legs bent inwardly as at 12 to engage over the edges of the adjacent parts.

The construction described and illustrated provides a simple joint construction for conduits of the kind described and which can be made with a minimum amount of labor and which require practically no cutting or fitting whatsoever of the parts. Special covers for the different joints must, of course, be provided, but as such joints are rather limited in number, only a limited number of special covers need be carried in stock. The main cover members and base members are all standard uniform stock and require no cutting or trimming other than to cut to lengths and the bending of the base member.

What I claim is:—

1. A joint for electrical conduits, comprising a base strip and a cover member, said base strip projecting beyond the cover member and being bent to project across the end thereof, a similar conduit member having its base fitted onto the bent end of the first named base and extending at an angle to the side edges thereof, and a hollow cover fitting over said angle joint.

2. A joint for electrical conduits, comprising a base strip and a cover member, said base strip projecting beyond the cover member and being bent to project across the end thereof, a second base strip connected to said bent end of the first base strip and extending at a right angle to the side edges of said bent end, a cover fitted onto the second base strip, and a hollow cover fitting over said joint.

3. A joint for electrical conduits, comprising a base strip and a cover member, said base strip projecting beyond the cover member and being bent to project across the end thereof, a second base strip connected to said bent end of the first base strip and extending at an angle in both directions to the side edges of said bent end, and a hollow cover fitting over said joint.

4. A joint for electrical conduits, comprising a base strip and a cover member, said base strip projecting beyond the cover member and being bent to project across the end thereof, a similar conduit member fitted on to the bent end of the base and extending at an angle to the side edges of said bent end, and a cover of channel or bow section having its edges bent inwardly and engaging over the edges of the adjacent cover members.

5. A joint for electrical conduits, comprising a substantially flat base strip, a cover member of channel or bow shape in cross section and having its edges bent inwardly and engaging the edges of the base strip, said base strip projecting beyond the cover and bent out of its general plane to project across the end of said cover, a second substantially flat base strip connected with said bent end and extending at right angles to the side edges of said bent end, a cover member of channel or bow form with inturned edges engaging the edges of said second base strip, and a cover of channel or bow form in cross section and having portions at right angles to each other, each of said portions being provided at its edges with inturned portions engaging over the edges of the adjacent cover members.

In testimony whereof I have hereunto set my hand.

CHAUNCEY W. ABBOTT.

Witnesses:
WILLIAM B. WHARTON,
GLENN H. LERESCHE.